No. 738,315. PATENTED SEPT. 8, 1903.
M. GEHRE.
WATER LEVEL INDICATING APPARATUS.
APPLICATION FILED JULY 9, 1902.
NO MODEL.
Fig. 1. Fig. 1a.
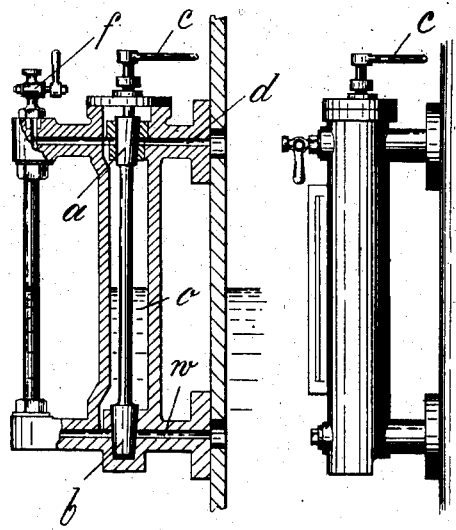
Fig. 2.
Fig. 2a.
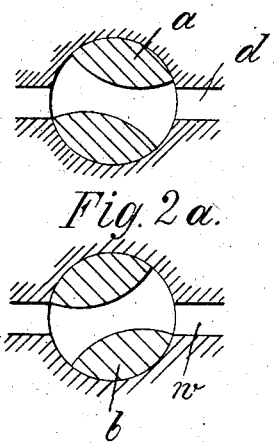
Fig. 3. Fig. 4. Fig. 5.
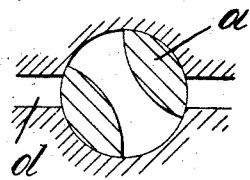 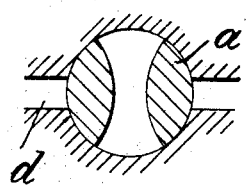 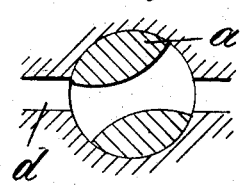
Fig. 3a. Fig. 4a. Fig. 5a.
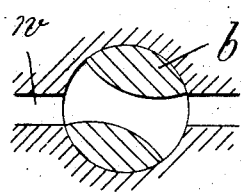 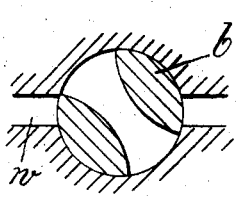 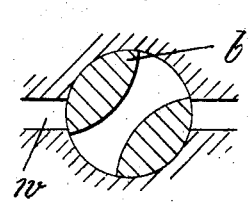
Witnesses.
Chas. G. Hensley.
Sophie Pekosky.
Inventor.
Max. Gehre.
By Joseph L. Levy
Asso. Atty.

No. 738,315. Patented September 8, 1903.

UNITED STATES PATENT OFFICE.

MAX GEHRE, OF RATH, GERMANY.

WATER-LEVEL-INDICATING APPARATUS.

SPECIFICATION forming part of Letters Patent No. 738,315, dated September 8, 1903.

Application filed July 9, 1902. Serial No. 114,885. (No model.)

*To all whom it may concern:*

Be it known that I, MAX GEHRE, a subject of the Emperor of Germany, residing at Rath, Germany, have invented certain new and useful Improvements in Water-Level-Indicating Apparatus, of which the following is a specification.

In the water-level-indicating apparatus in which cut-off devices are attached above for steam and beneath for water during the operation of the device as a rule a drip of water takes place from the lower member whose connection with the outer handle leads naturally from the water-space into the atmosphere as it lies beneath the water-level of the boiler. The upper cut-off organs lying in the steam-space do not drip. To prevent dripping of the water-cut-off organ, an arrangement is provided characterized, essentially, by the fact that the steam and water cut-off organs are connected with each other in a closed space arranged beneath the water-level and outside the steam-boiler and are so connected that they can be suitably operated by means of a handle common to both arranged above the water-line and which by the relative position of their throughway-openings to one another are so arranged that the water or steam, or both together, may be closed off or opened.

In the accompanying drawings, Figure 1 is a longitudinal vertical section through the water-level apparatus. Fig. 1$^a$ is an elevation thereof. Figs. 2 and 2$^a$, 3 and 3$^a$, 4 and 4$^a$, 5 and 5$^a$ show enlarged cross-sections thereof.

To avoid dripping, the position of the water-cut-off organ $b$ is regulated by a handle which leads outward through the steam-space and at the same time is so connected with the steam-cut-off organ $a$ that both can be so adjusted by a lever $c$ that steam and water, each alone or both together, are closed or open. $a$ and $b$, as well as their connection, are arranged in a space $o$, closed to the outside. For the purpose referred to $a$ is connected to $b$, and the openings in $a$ and $b$ are made somewhat wider than the corresponding channels $d$ and $w$.

The positions of both cut-off organs $a$ and $b$ to one another are so chosen that, as Figs. 2 and 2$^a$ show, both passages are open. By further turning, as indicated at Figs. 3 and 3$^a$, the steam-passage is closed, but the water-channel still remains open. By still further turning both water and steam are cut off, Figs. 4 and 4$^a$, while in Figs. 5 and 5$^a$ the steam-channel is open and the water is cut off. Thus one is able by means of a handle or lever $c$, leading outwardly upward from the steam-space, to produce all the positions of the cut-off members. The water-drain pipe is arranged above. The water can be blown off through the glass when the cut-off members assume the positions shown in Figs. 3 and 3$^a$. Figs. 2, 2$^a$, 3, 3$^a$, 4, 4$^a$, 5, 5$^a$ show sections, of which the upper are made through the steam-passage $d$ and the under ones through the water-channel $w$.

What I claim, and desire to secure by Letters Patent of the United States, is—

In a water-indicating apparatus, in combination with the glass, connected by by-passes with the boiler, a closed casing outside the boiler, the extremities of which extend above and below the normal height of the water in the boiler, the said casing connecting the upper and lower by-passes, steam and water cut-off organs larger than the by-passes, said organs being rigidly connected to a common spindle, the cut-offs being arranged in such relation that either upper, lower or both upper and lower by-passes may be opened or closed, and operating means connected with said spindle, substantially as described.

In testimony whereof I have hereunto set my hand in the presence of two witnesses.

MAX GEHRE. [L. S.]

Witnesses:
PETER LIEBER,
WILLIAM ESSENWEIN.